United States Patent
Gulec

(10) Patent No.: US 10,580,098 B2
(45) Date of Patent: Mar. 3, 2020

(54) VOICE ACTIVATED HOTEL ROOM MONITOR

(71) Applicant: Virtual OnQ Systems, LLC, Plantation, FL (US)

(72) Inventor: Gokhan Gulec, Plantation, FL (US)

(73) Assignee: VIRTUAL ONQ SYSTEMS, LLC, Plantation, FL (US)

( * ) Notice: Subject to any disclaimer, the term of this patent is extended or adjusted under 35 U.S.C. 154(b) by 215 days.

(21) Appl. No.: 15/607,577

(22) Filed: May 29, 2017

(65) Prior Publication Data

US 2018/0342021 A1 Nov. 29, 2018

(51) Int. Cl.
| | |
|---|---|
| *G06Q 50/12* | (2012.01) |
| *G06F 3/16* | (2006.01) |
| *G06F 15/78* | (2006.01) |
| *G07C 1/10* | (2006.01) |
| *G10L 15/22* | (2006.01) |

(52) U.S. Cl.
CPC ............ *G06Q 50/12* (2013.01); *G06F 3/167* (2013.01); *G06F 15/7839* (2013.01); *G07C 1/10* (2013.01); *G10L 2015/223* (2013.01); *G10L 2015/225* (2013.01)

(58) Field of Classification Search
None
See application file for complete search history.

(56) References Cited

U.S. PATENT DOCUMENTS 6,314,165 B1 * 11/2001 Junqua ............... G10L 15/26
379/216.01
10,043,516 B2 * 8/2018 Saddler ............... G10L 15/1815

* cited by examiner

*Primary Examiner* — Paul Danneman
(74) *Attorney, Agent, or Firm* — Steven M. Greenberg, Esq.; Shutts & Bowen LLP

(57) ABSTRACT

A method for voice activated hotel room monitoring includes transmitting to a mobile number from a voice driven computer assistant disposed within a room of a hotel, a message inviting registration of a guest assigned to the room. In response to a registration of the guest received from the number, a unique identifier is assigned to the guest, a record is stored in a registry that associates the guest with the identifier and the room, and the identifier is transmitted to the mobile number. Thereafter, a voice command is detected in the assistant and, in response, the command is speech recognized into text and parsed to locate the identifier. Then, the registry is queried with the identifier. In the event that the identifier corresponds to the guest assigned to the room, a directive in the text is processed in connection with a service offered to the guest by the hotel.

20 Claims, 2 Drawing Sheets

VOICE ACTIVATED HOTEL ROOM MONITOR

BACKGROUND OF THE INVENTION

Field of the Invention

The present invention relates to a voice driven computer assistant and more particularly, to a voice driven computer assistant disposed within a hotel room.

Description of the Related Art

The term hotel refers to a place of lodging for members of the public who may contract for the right to temporarily live within a room or rooms of a building. Most hotels provide additional temporary living services including food service, valet parking service, laundry service and the like. Customarily, hotels may often provide for the concierge treatment of its guests. To invoke concierge services, a hotel guest generally phones the relevant agent of the hotel and orally requests one or hotel services. Advancements in technology, though, permit automated requesting of hotel services. Most notably, hotel guests in some hotels may request services electronically through a computing portal. In some instances, the computing portal is provided through a television set present in the hotel room. In other instances, the computing portal is accessible through the Web browser of a computing device of a guest within the hotel room accessing a computer network provided by the hotel.

Recent advancements in technology encourage the use of mobile devices by hotel guests in accessing hotel services. However, providing and maintaining a multiplicity of mobile devices for use by guests presents several challenges for the hotel, including the problem of ensuring sanitary conditions in the hotel room through the constant disinfecting of the devices as different guests use the devices. Alternatives to the use of a mobile device include voice activated concierge devices in which the guest speaks to a voice activated device and orally requests hotel services. But, in the latter instance, a security concern arises in which any person may enter a hotel room and request costly services for which the hotel guest assigned to the hotel room may be responsible but unaware of the request.

BRIEF SUMMARY OF THE INVENTION

Embodiments of the present invention address deficiencies of the art in respect to hotel room monitoring and provide a novel and non-obvious method, system and computer program product for voice activated hotel room monitoring. In accordance with an embodiment of the invention, a method for voice activated hotel room monitoring includes the transmission to a mobile telephone number from a voice driven computer assistant disposed within a hotel room of a hotel, of a message inviting registration of a hotel guest assigned to the hotel room. The method also includes a response to a registration of the hotel guest received from the mobile telephone number by assigning a unique identifier to the hotel guest, storing a record in a registry for the hotel associating the hotel guest with the unique identifier and the hotel room, and transmitting to the mobile telephone number, the unique identifier. Thereafter, a voice command is detected in the voice driven computer assistant. Finally, in response to the voice command, the voice command is speech recognized into command text and parsed so as to locate the unique identifier. Then, the registry is queried with the unique identifier and it is determined if the identifier corresponds to the hotel guest assigned to the hotel room. In the event that the unique identifier corresponds to the hotel guest assigned to the hotel room, a directive disposed in the command text is processed in connection with a hotel service offered to the hotel guest by the hotel.

In one aspect of the embodiment, it is further determined if the identifier corresponds to a hotel agent of the hotel, and on condition that the unique identifier corresponds to a hotel agent of the hotel, a directive disposed in the command text is processed recording a record of the presence of the hotel agent in the hotel room. Likewise, in another aspect of the embodiment, it is determined if the identifier corresponds to a hotel agent of the hotel, and on condition that the unique identifier corresponds to a hotel agent of the hotel, a directive disposed in the command text is processed to alert hotel security of an emergency condition in the hotel room. In yet another aspect of the embodiment, the directive disposed in the command text in connection with the hotel service is a directive to order room service or a directive to retrieve a vehicle from valet. Finally, in even yet another aspect of the embodiment, a payment form is transmitted to the mobile telephone number in response to the directive ordering a hotel service.

In another embodiment of the invention, a data processing system is adapted for voice activated hotel room monitoring. The system includes a host computing system with one or more computers, each with memory and at least one central processing unit (CPU). The system also includes a multiplicity of voice driven computer assistants. Each assistant is disposed in a corresponding one of a multiplicity of hotel rooms of a hotel and each has both memory and a CPU and also a communicative coupling to the host computing system over a computer communications network in the hotel. The system yet further includes a data store coupled to the host computing system that includes a registry of registered hotel guests and correspondingly assigned ones of the hotel rooms. Finally, the system includes a voice activated hotel room monitoring module disposed in the memory of each of the voice driven computer assistants.

The module includes program code that when executed by a CPU in a corresponding one of the voice driven computer assistants disposed in a respective one of the hotel rooms, transmits to a mobile telephone number a message inviting registration of a hotel guest assigned to the respective one of the hotel rooms and responds to a registration of the hotel guest received from the mobile telephone number by assigning a unique identifier to the hotel guest, storing a record in the registry associating the hotel guest with the unique identifier and the respective one of the hotel rooms, and transmitting to the mobile telephone number, the unique identifier. The program code when executed by a CPU in a corresponding one of the voice driven computer assistants in a respective one of the hotel rooms additionally detects in the corresponding one of the voice driven computer assistants a voice command and responds to the voice command by speech recognizing the voice command into command text, parsing the command text to locate the unique identifier, querying the registry with the unique identifier, determining if the identifier corresponds to the hotel guest assigned to the respective one of the hotel rooms, and on condition that the unique identifier corresponds to the hotel guest assigned to the respective one of the hotel rooms, processing a directive disposed in the command text in connection with a hotel service offered to the hotel guest by the hotel.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for voice activated hotel room monitoring. In accordance with an embodiment of the invention, a multiplicity of voice driven computer assistants may be disposed in respectively different hotel rooms in a hotel. Each voice driven computer assistant provides a voice activated user interface in which speech commands directed to the assistant are speech recognized and processed to effectuate spoken directives included within the commands. Each assistant is communicatively linked to a registry of hotel guests staying in different ones of the hotel rooms. In operation, a registration invitation is provided to the mobile device of each guest in response to which each guest may register for voice activated hotel room monitoring. During registration, each guest is assigned a unique identifier such as a personal identification number or code word. The identifier and associated guest and an indication of a hotel room to which the associated guest is assigned are then recorded in the registry.

Thereafter, each guest may direct voice commands to a corresponding one of the assistants disposed within a respective one of the hotel rooms. Each voice command may include the identifier. In response to receiving a voice command, the assistant first speech recognizes the voice command and then parses the resultant command text to locate the identifier. The assistant then queries the registry with the identifier and the room indication in which the command had been received. On the condition that the registry has a record correlating the identifier with the room indication, the directive within the voice command is then processed, such as a request for room service, valet service, or a movie. Otherwise, the voice command is ignored. Optionally, upon receiving the voice command, even if an identifier is not found in the registry for the room, it may be determined if the directive within the voice command is permitted irrespective of the absence of the identifier in the registry for the room. If so, the directive is processed.

Figure 1:
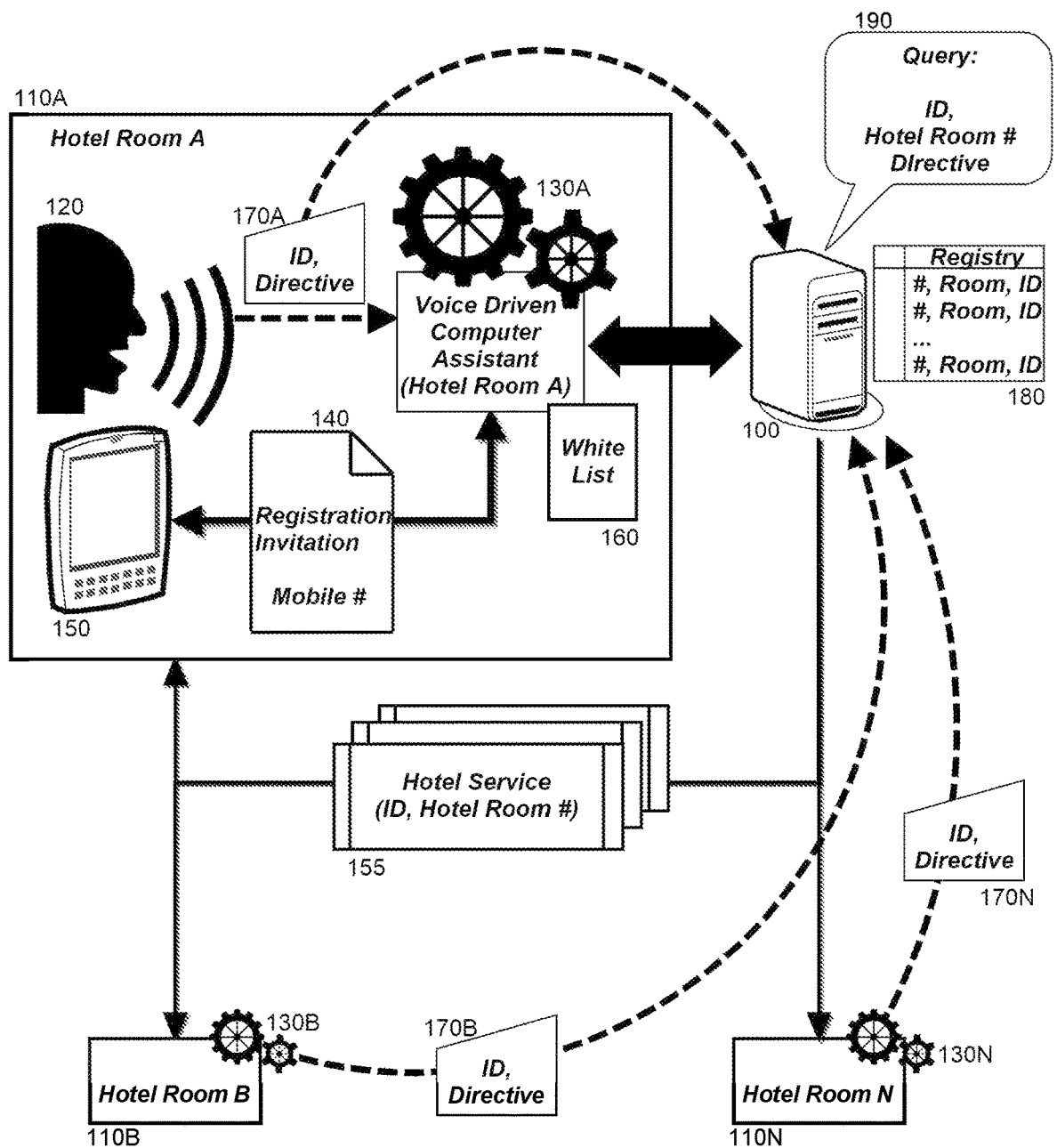
FIG. 1 is pictorial illustration of a process for voice activated hotel room monitoring.

In further illustration, FIG. 1 pictorially shows a process for voice activated hotel room monitoring. As shown in FIG. 1, a multiplicity of voice driven computer assistants 130A, 130B, 130N are disposed within respectively different hotel rooms 110A, 110B, 110N. A hotel guest 120 enters a corresponding one of the hotel rooms 110A, 110B, 110N with a mobile device 150 such as a mobile telephone and receives a registration invitation from either the voice driven computer assistant 130A, 130B, 130N, or a host computing system 100 communicatively linked to each of the voice driven computer assistants 130A, 130B, 130N. In this regard, the registration invitation may be e-mailed, instant messaged or text messaged to the mobile device 150, or the hotel guest 120 may access a Web page provided by host computing system 100 and facilitating registration of the mobile device 150.

In response to the registration of the mobile device 150, a unique identifier is generated for the hotel guest 120 and a record is written to a registry 180 associating the unique identifier with the particular one of the hotel rooms 110A, 110B, 110N assigned to the hotel guest 120. Thereafter, the hotel guest 120 may issue a spoken voice command to the voice driven computer assistant 130A, 130B, 130N within the particular one of the rooms 110A, 110B, 110N to which the hotel guest 120 has been assigned. The voice driven computer assistant 130A, 130B, 130N in turn speech recognizes the voice command to produce command text 170A, 170B, 170N. The command text 170A, 170B, 170N is then parsed to extract therefrom both the unique identifier, if any, and a corresponding directive.

Upon locating the unique identifier, the voice driven computer assistant 130A, 130B, 130N issues a query 100 to the registry 180 in order to determine if a record exists in the registry 180 that correlates the unique identifier with the particular one of the hotel rooms 110A, 110B, 110N in which the voice command had been received. To the extent that a record is located in the registry 180 that correlates the unique identifier with the particular one of the hotel rooms 110A, 110B, 110N in which the voice command had been received, the directive of the command text 170A, 170B, 170N is then processed to provide a requested hotel service 155 to the hotel guest 120. To the extent that the record is not located in the registry 180 that correlates the unique identifier with the particular one of the hotel rooms 110A, 110B, 110N in which the voice command had been received, the directive of the command text 170A, 170B, 170N still may be processed to the extent that the directive of the command text 170A, 170B, 170N is present in a white list 160 of directives, for instance directives related to the operation of the lighting of the hotel room 110A, 110B, 110N or the operation of a television set within the hotel room 110A, 110B, 110N.

Optionally, an agent of the hotel, such as staff member of the hotel, may also issue voice commands to the voice driven computer assistant 130A, 130B, 130N. In this regard, each agent of the hotel may be registered with a unique identifier that is not correlated to any particular one of the rooms 110A, 110B, 110N. Upon receiving a voice command by the agent in one of the rooms 110A, 110B, 110N, a limited set of hotel services 155 may be provided to the agent, such as logging a presence of the agent in a particular one of the rooms 110A, 110B, 110N, or summoning emergency assistance to a particular one of the rooms 110A, 110B, 110N in which the voice command is received from the agent.

Figure 2:
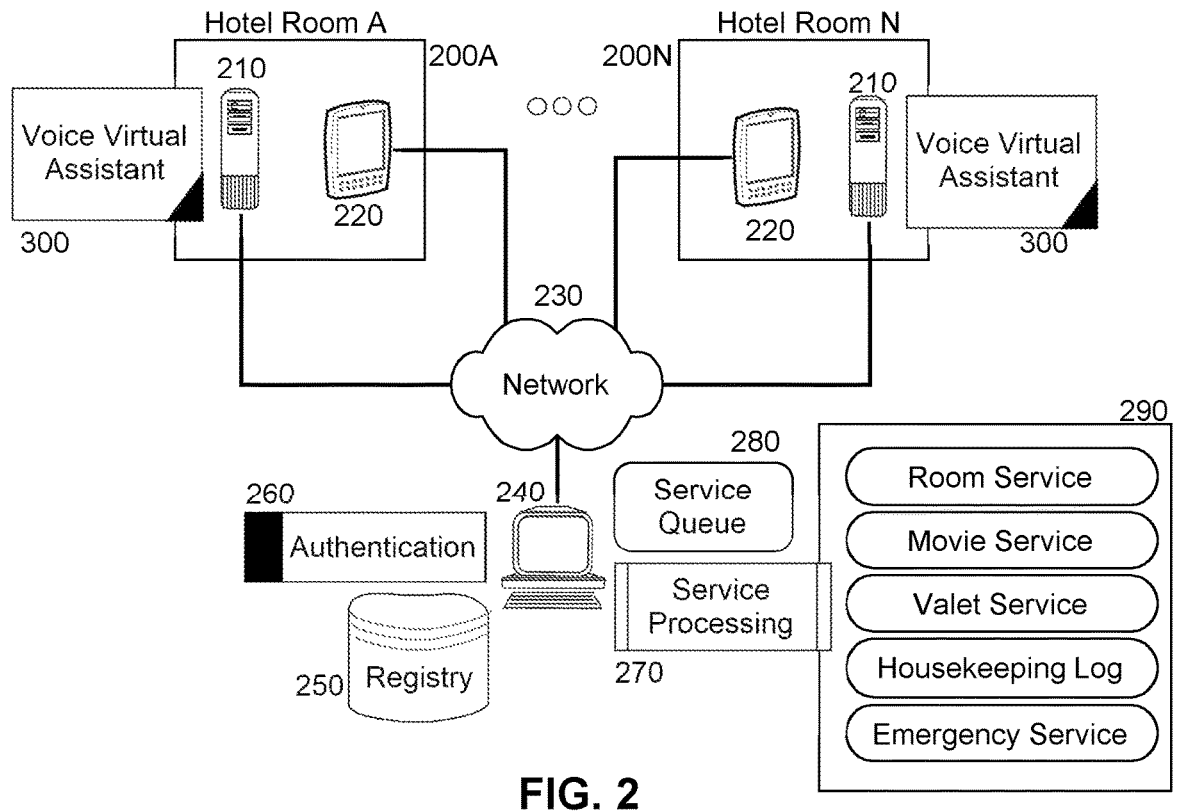
FIG. 2 is a schematic illustration of a data processing system adapted for voice activated hotel room monitoring; and, FIG. 3 is a flow chart illustrating a process for voice activated hotel room monitoring.

The process described in connection with FIG. 1 may be implemented in a data processing system. In yet further illustration, FIG. 2 schematically shows a data processing system adapted for voice activated hotel room monitoring. The system includes a multiplicity of different voice driven computer assistants 210 disposed within respectively different hotel rooms 200A, 200N. Each of the different voice driven computer assistants 210 include at least one CPU and memory are communicatively coupled over computer communications network 230 to a host computing system 240 which also includes one or more computers, each with memory and at least one CPU. The host computing system 240 is coupled to a registry 250 of records correlating unique identifiers with particular ones of the rooms 200A, 200N and supports the operation of authentication logic 260 programmed to respond to queries locating records in the registry 250 for specified ones of the unique identifiers and corresponding ones of the rooms 200A, 200N. As well, the host computing system 240 supports the operation of service processing logic 270 that manages service requests to provide hotel services 290 to requesting hotel guests, for example room service, a movie service, a valet service, a housekeeper logging service or an emergency service.

Of note, each of the voice driven computer assistants 210 executes therein a voice virtual assistant module 300. The voice virtual assistant module 300 includes program code that during execution, responds to the registration of a mobile device 220 of a hotel guest in a corresponding one of the rooms 200A, 200N by receiving voice commands in the corresponding one of the rooms 200A, 200N, speech recognizing each received voice command to produce command text, locating within the command text a unique identifier, requesting the authentication logic 260 to verify in the registry 250 that the unique identifier is associated with a hotel guest in the corresponding one of the rooms 200A, 200N and, if so, requesting processing by the service processing logic 270 of a directive in the command text to receive one of the services 290.

Optionally, a service queue 280 is maintained in the host computing system 240. The service queue 280 is a queue of directives to be processed on behalf of different hotel guests in different ones of the rooms 200A, 200N as requested by the voice virtual assistants 300 in each of the rooms 200A, 200N. The service queue 280 may be ordered in terms of the time which each of the directives is received for processing by service processing logic 270. Alternatively, service queue 280 may be ordered in terms of the location of each of the rooms 200A, 200N from which the directives are received with some locations given higher priority than other locations. As yet another alternative, service queue 280 may be ordered in terms of the loyalty program status of the hotel guests issuing the directives. And, as even yet another alternative, service queue 280 may be ordered in terms of the type of directive received with some directives being prioritized over others, such as room service orders receiving a higher priority than a request for turndown service, or a room service order for hot food receiving a higher priority than a room service order for cold food.

Figure 3:
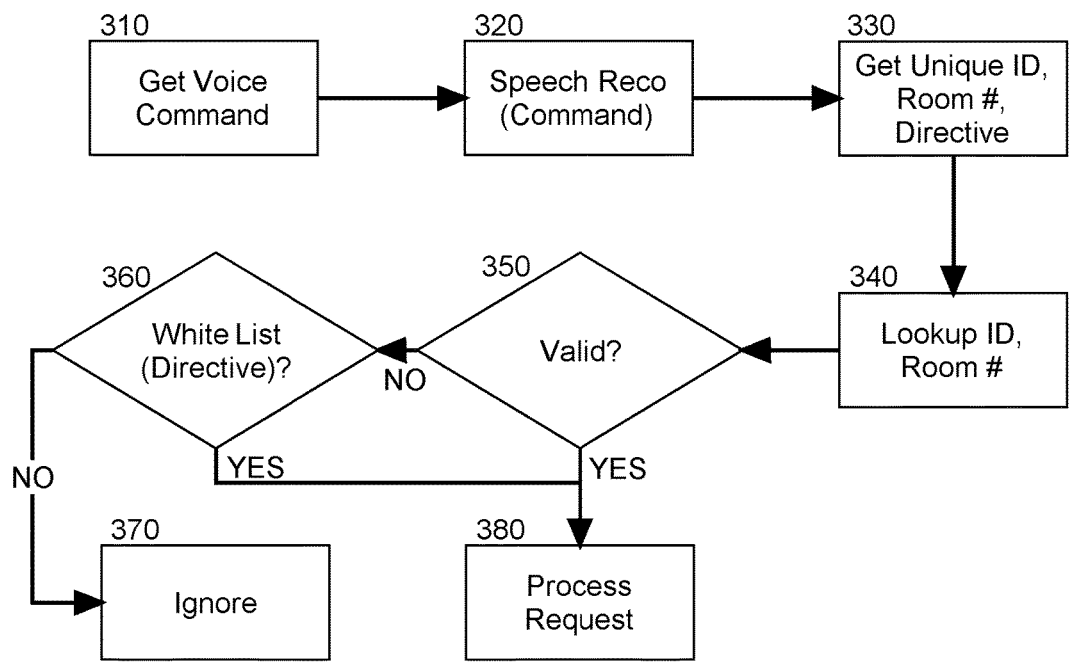

In even yet further illustration of the operation of the voice virtual assistant 300, FIG. 3 is a flow chart illustrating a process for voice activated hotel room monitoring. Beginning in block 310, a voice command is received in a hotel room of a hotel. In block 320, the voice command is speech recognized to produce command text. In block 330, a unique identifier disposed within the command text can be retrieved, as can a room number in which voice command is received and a directive to receive processing of hotel services. In block 340, the registry can be consulted to determine if a record exists indicating that the individual associated with the unique identifier is permitted to request the processing of the hotel services within the room corresponding to the room number.

In decision block 350, if the voice command is determined to be valid meaning that a record exists in the registry indicating that the individual associated with the unique identifier is permitted to request the processing of the hotel services within the room corresponding to the room number, then in block 380 the directive is processed to deliver the requested hotel services, for instance room service or valet service, hotel personnel logging or emergency services. But, in decision block 350 the voice command is determined not to be valid based upon the records present in the registry, in decision block 360 it is determined if the directive is present in a white list of directives that may be issued irrespective of the individual requesting the corresponding hotel services, for example operating the hotel room lighting or television set. If so, then in block 380 the directive processed to deliver the requested hotel services despite the invalidity of the voice command. Otherwise, in block 370 the voice command is ignored.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A method for voice activated hotel room monitoring comprising:
    transmitting to a mobile telephone number from a voice driven computer assistant disposed within a hotel room of a hotel, a message inviting registration of a hotel guest assigned to the hotel room;
    responding to a registration of the hotel guest received from the mobile telephone number by assigning a unique identifier to the hotel guest, storing a record in a registry for the hotel associating the hotel guest with the unique identifier and the hotel room, and transmitting to the mobile telephone number, the unique identifier;
    detecting in the voice driven computer assistant a voice command; and,
    responsive to the voice command, speech recognizing the voice command into command text, parsing the command text to locate the unique identifier, querying the registry with the unique identifier, determining if the identifier corresponds to the hotel guest assigned to the hotel room, and on condition that the unique identifier corresponds to the hotel guest assigned to the hotel room, processing a directive disposed in the command text in connection with a hotel service offered to the hotel guest by the hotel; and,
    on condition that the unique identifier is not located in the registry in correspondence to the hotel guest assigned to the hotel room, processing the directive in response to locating the directive in a white list of directives.

2. The method of claim 1, further comprising:
    determining if the identifier corresponds to a hotel agent of the hotel, and on condition that the unique identifier corresponds to a hotel agent of the hotel, processing a directive disposed in the command text recording a record of the presence of the hotel agent in the hotel room.

3. The method of claim 1, further comprising:
    determining if the identifier corresponds to a hotel agent of the hotel, and on condition that the unique identifier corresponds to a hotel agent of the hotel, processing a directive disposed in the command text to alert hotel security of an emergency condition in the hotel room.

4. The method of claim 1, wherein the directive disposed in the command text in connection with the hotel service is a directive to order room service.

5. The method of claim 1, wherein the directive disposed in the command text in connection with the hotel service is a directive to retrieve a vehicle from valet.

6. The method of claim 1, wherein a payment form is transmitted to the mobile telephone number in response to the directive ordering a hotel service.

7. A data processing system adapted for voice activated hotel room monitoring, the system comprising:
    a host computing system comprising one or more computers, each with memory and at least one central processing unit (CPU);
    a multiplicity of voice driven computer assistants, each disposed in a corresponding one of a multiplicity of hotel rooms of a hotel and having both memory and a CPU and also a communicative coupling to the host computing system over a computer communications network in the hotel;
    a data store coupled to the host computing system comprising a registry of registered hotel guests and correspondingly assigned ones of the hotel rooms; and,
    a voice activated hotel room monitoring module disposed in the memory of each of the voice driven computer assistants, the module comprising program code that when executed by a CPU in a corresponding one of the voice driven computer assistants disposed in a respective one of the hotel rooms:
    transmits to a mobile telephone number a message inviting registration of a hotel guest assigned to the respective one of the hotel rooms,
    responds to a registration of the hotel guest received from the mobile telephone number by assigning a unique identifier to the hotel guest, storing a record in the registry associating the hotel guest with the unique identifier and the respective one of the hotel rooms, and transmitting to the mobile telephone number, the unique identifier, detects in the corresponding one of the voice driven computer assistants a voice command, and responds to the voice command by speech recognizing the voice command into command text, parsing the command text to locate the unique identifier, querying the registry with the unique identifier, determining if the identifier corresponds to the hotel guest assigned to the respective one of the hotel rooms, and on condition that the unique identifier corresponds to the hotel guest assigned to the respective one of the hotel rooms, processing a directive disposed in the command text in connection with a hotel service offered to the hotel guest by the hotel; and, on condition that the unique identifier is not located in the registry in correspondence to the hotel guest assigned to the hotel room, processes the directive in response to locating the directive in a white list of directives.

8. The system of claim 7, wherein the program code of the module further determines if the identifier corresponds to a hotel agent of the hotel, and on condition that the unique identifier corresponds to a hotel agent of the hotel, processes a directive disposed in the command text recording a record of the presence of the hotel agent in the respective one of the hotel rooms.

9. The system of claim 7, wherein the program code of the module further determines if the identifier corresponds to a hotel agent of the hotel, and on condition that the unique identifier corresponds to a hotel agent of the hotel, processes a directive disposed in the command text to alert hotel security of an emergency condition in the respective one of the hotel rooms.

10. The system of claim 7, wherein the directive disposed in the command text in connection with the hotel service is a directive to order room service.

11. system of claim 7, wherein the directive disposed in the command text in connection with the hotel service is a directive to retrieve a vehicle from valet.

12. The system of claim 7, wherein a payment form is transmitted to the mobile telephone number in response to the directive ordering a hotel service.

13. The system of claim 7, further comprising a queueing module comprising program code executing in the memory of the host computing system, the program code during execution queueing different directives for different hotel services based upon a time when the directives are received in corresponding ones of the voice driven computer assistants.

14. The system of claim 7, further comprising a queueing module comprising program code executing in the memory of the host computing system, the program code during execution queueing different directives for different hotel services based upon a location of the voice driven computer assistants in which the directives are received.

15. A computer program product for voice activated hotel room monitoring, the computer program product including a computer readable storage medium having program instructions embodied therewith, wherein the computer readable storage medium is not a transitory signal per se, wherein the program instructions are executable by a device to cause the device to perform a method including:

transmitting to a mobile telephone number from a voice driven computer assistant disposed within a hotel room of a hotel, a message inviting registration of a hotel guest assigned to the hotel room;

responding to a registration of the hotel guest received from the mobile telephone number by assigning a unique identifier to the hotel guest, storing a record in a registry for the hotel associating the hotel guest with the unique identifier and the hotel room, and transmitting to the mobile telephone number, the unique identifier;

detecting in the voice driven computer assistant a voice command; and, responsive to the voice command, speech recognizing the voice command into command text, parsing the command text to locate the unique identifier, querying the registry with the unique identifier, determining if the identifier corresponds to the hotel guest assigned to the hotel room, and on condition that the unique identifier corresponds to the hotel guest assigned to the hotel room, processing a directive disposed in the command text in connection with a hotel service offered to the hotel guest by the hotel: and, on condition that the unique identifier is not located in the registry in correspondence to the hotel guest assigned to the hotel room, processing the directive in response to locating the directive in a white list of directives.

16. The computer program product of claim 15, wherein the method further comprises:

determining if the identifier corresponds to a hotel agent of the hotel, and on condition that the unique identifier corresponds to a hotel agent of the hotel, processing a directive disposed in the command text recording a record of the presence of the hotel agent in the hotel room.

17. The computer program product of claim 15, wherein the method further comprises:

determining if the identifier corresponds to a hotel agent of the hotel, and on condition that the unique identifier corresponds to a hotel agent of the hotel, processing a directive disposed in the command text to alert hotel security of an emergency condition in the hotel room.

18. The computer program product of claim 15, wherein the directive disposed in the command text in connection with the hotel service is a directive to order room service.

19. The computer program product of claim 15, wherein the directive disposed in the command text in connection with the hotel service is a directive to retrieve a vehicle from valet.

20. The computer program product of claim 15, wherein a payment form is transmitted to the mobile telephone number in response to the directive ordering a hotel service.

* * * * *